United States Patent
Lee

(10) Patent No.: US 9,201,140 B2
(45) Date of Patent: Dec. 1, 2015

(54) METHOD AND APPARATUS FOR MEASURING DISTANCES, AND METHOD FOR DETERMINING POSITIONS

(75) Inventor: Kyungkuk Lee, Seoul (KR)

(73) Assignee: ORTHOTRON CO., LTD. (KR)

( * ) Notice: Subject to any disclaimer, the term of this patent is extended or adjusted under 35 U.S.C. 154(b) by 39 days.

(21) Appl. No.: 14/114,256

(22) PCT Filed: Apr. 25, 2012

(86) PCT No.: PCT/KR2012/003155
§ 371 (c)(1),
(2), (4) Date: Oct. 28, 2013

(87) PCT Pub. No.: WO2012/148153
PCT Pub. Date: Nov. 1, 2012

(65) Prior Publication Data
US 2014/0057655 A1  Feb. 27, 2014

(30) Foreign Application Priority Data
Apr. 29, 2011 (KR) .......................... 10-2011-0041183

(51) Int. Cl.
*H04W 24/00* (2009.01)
*G01S 11/02* (2010.01)
(Continued)

(52) U.S. Cl.
CPC ................. *G01S 11/02* (2013.01); *G01S 13/74* (2013.01); *G01S 13/878* (2013.01)

(58) Field of Classification Search
CPC ...... H04W 4/028; H04W 64/00; G01S 11/02; G01S 13/74; G01S 17/36; G01S 13/878; G01S 7/4915

USPC ................. 455/456.1, 456.5, 404.2, 440, 444
See application file for complete search history.

(56) References Cited

U.S. PATENT DOCUMENTS 5,945,949 A * 8/1999 Yun .............................. 342/457
6,788,945 B1 * 9/2004 Echols et al. .............. 455/456.5
(Continued)

FOREIGN PATENT DOCUMENTS

JP          2008-039738 A    2/2008
KR    10-2003-0003382 A    1/2003
(Continued)

OTHER PUBLICATIONS

International Search Report (in Korean and English) for PCT/KR2012/003155, mailed Nov. 7, 2012; ISA/KR.

*Primary Examiner* — Kashif Siddiqui
*Assistant Examiner* — Mong-Thuy Tran
(74) *Attorney, Agent, or Firm* — Harness, Dickey & Pierce, P.L.C.

(57) ABSTRACT

The present disclosure provides a ranging method by using a first signal transmitted by a first device, and a second signal generated and transmitted by a target device in response to the first signal. The ranging method calculates the distance between the target device and a second device being in communication with the first and target devices, by using: a first time interval from a point in time of first device's transmitting the first signal to a point of receiving first part of the second signal; a second time interval from a point of the second device's receiving the first signal to a point receiving the first part of the second signal; and a delay time interval from a point of the target device's receiving the first signal to a start time of the second signal and a duration of the first part of the second signal.

9 Claims, 8 Drawing Sheets

(51) Int. Cl.
*G01S 13/74* (2006.01)
*G01S 13/87* (2006.01)

(56) References Cited

U.S. PATENT DOCUMENTS

| | | | |
|---|---|---|---|
| 2002/0155845 A1* | 10/2002 | Martorana | 455/456 |
| 2004/0203420 A1 | 10/2004 | Rick et al. | |
| 2005/0035897 A1 | 2/2005 | Perl et al. | |
| 2006/0012476 A1* | 1/2006 | Markhovsky et al. | 340/539.32 |
| 2007/0139200 A1* | 6/2007 | Yushkov et al. | 340/572.1 |
| 2009/0005061 A1* | 1/2009 | Ward et al. | 455/456.1 |
| 2009/0201152 A1* | 8/2009 | Karr et al. | 340/545.6 |
| 2010/0130225 A1* | 5/2010 | Alles et al. | 455/456.1 |
| 2011/0221635 A1* | 9/2011 | Wang | 342/463 |

FOREIGN PATENT DOCUMENTS

| | | |
|---|---|---|
| KR | 10-2004-0099434 A | 11/2004 |
| KR | 10-2006-0132191 A | 12/2006 |
| WO | WO-00-75681 A1 | 12/2000 |
| WO | WO-2008-110157 A2 | 9/2008 |
| WO | WO-2009-145325 A1 | 12/2009 |

* cited by examiner

METHOD AND APPARATUS FOR MEASURING DISTANCES, AND METHOD FOR DETERMINING POSITIONS

TECHNICAL FIELD

The present disclosure in one or more embodiments relates to a ranging method for measuring a spatial distance between devices and a positioning method using thereof.

BACKGROUND

The statements in this section merely provide background information related to the present disclosure and may not constitute prior art.

For military or commercial purposes, technologies have been developed for measuring a distance to a particular device or determining a position of a particular device by using a measured distance. Particularly, with the development of a wireless communication technology, the spotlight is on a location based service (LBS) for providing a wireless terminal user with various services based on the user's location. In order to provide the location based service, a technology is required to measure the distance to the user and precisely determines the user's location by using the measured distance.

There have been various ranging methods and positioning methods, and a Round Trip Time of Arrival (RT-ToA) method and a Time Difference of Arrival (TDoA) method are notables among them.

Basic operational principle of the RT-ToA method is described below.

(a) When a transceiver A transmits signal A, a transceiver B receives signal A and transmits reply signal B upon completion of receiving signal A.

(b) Transceiver B measures elapsed time Treply from an end time point of the received signal A to an end time point of the transmitted signal B and then transmits the measured value to transceiver A through a separate signal. In order for transceiver B to transmit measured value Treply to transceiver A, at least two additional signals are needed including a data transmission signal for transmitting measured value Treply and a reply signal from transceiver A with respect to the data transmission signal.

(c) Transceiver A takes measured elapsed time value Tround from the end point of the transmitted signal A to the end point of the received signal B and value Treply received from transceiver B through the separate signal to calculate ToA=(Tround−Treply)/2. A value of a spatial distance between transceiver A and transceiver B can be calculated by multiplying ToA by signal transmission speed c of a medium.

By using the RT-ToA method, the location of a target device can be determined.

For example, in order to determine the position of the target device, a target device positioning system engaging three Access Points (APs) may use trilateration method in which the three APs respectively measure spatial distances d0, d1 and d2 to the target device through the RT-ToA method and form three circles having radiuses of d0, d1 and d2 centered about the positions of the APs for acquiring the intersecting point of the three circles.

A ranging and positioning method based on the RT-ToA has an advantage of a simple structure since no clock synchronization is needed between devices. Further, an analysis of the positioning precision for the target device reveals no significant difference between cases where the target device is located inside and outside of a cell formed of APs. The RT-ToA based method is characterized in that the margin of a positioning error stably amounts to a ranging error.

However, as described above, the RT-ToA method requires four signal exchanges between the transceivers. Accordingly, when the position of the target device is measured by using three APs, four signal exchanges are required between each AP and the target device to a total of twelve signal exchanges, thereby increasing loads on an air interface. Further, when there is a deviation between clock frequencies of the transceivers, the resultant ranging error becomes significant.

Meanwhile, an operational principle of the TDoA method is as follows:

(a) The target device transmits a blink signal.

(b) Each of three or more APs measures an arrival time of received blink signal and transmits the measured arrival time to a locating server.

(c) The locating server calculates a time difference by using the measured arrival time transmitted from each of the APs.

(d) The position of the target device is determined by the trilateration method of forming paraboloids with given position values of the APs and acquiring the common intersection point where the paraboloids meet each other.

The positioning system using the TDoA measures arrival times of signals received by the APs by simply having the target device transmit a blink signal once and the APs just receive the same signal.

The TDoA method has an advantage of a simple circuit configuration and a simple signaling method since the target device has only to transmit a signal and the APs have only to receive the same. However, the TDoA method is disadvantageous as for requiring additional system configuration and circuitry dedicated to the inherent clock synchronization between the APs.

Further, when analyzing the positioning precision for the target device with slight errors occurred in the arrival times of the signals received by the APs, the margin of the positioning error stably amounts to the error of the arrival time measurement if the target device is located inside the cell formed by the APs. However, if the target device is located outside the cell, the positioning error tends to become larger by a factor of several times to several dozen times of the arrival time measurement error depending on the position of the target device and thus is very unreliable.

DISCLOSURE

Technical Problem

The present disclosure provides ranging and positioning technologies which combine the positioning precision both inside and outside of the cell without requiring clock synchronization as comparable to the excellence of the RT-ToA method with the positioning system and signal exchange scheme as simple as the TDoA method. Further, the present disclosure provides a ranging and positioning method which can compensate for ranging and positioning errors due to clock frequency deviations between devices.

SUMMARY

In accordance with some embodiments, the present disclosure provides a ranging method by using a first signal transmitted by a first device and a second signal generated and transmitted by a target device in response to the first signal, the method calculating a distance between the target device and a second device in communication with the first device and the target device, by using a first time interval from a time point of the first device's transmitting the first signal to a time point of the first device's receiving a first part of the second signal, a second time interval from a time point of the second device's receiving the first signal to a time point of the second device's receiving the first part of the second signal, and a delay time interval from a time point of the target device's receiving the first signal to a start time of the second signal and a duration of the first part of the second signal.

Another at least one embodiment of the present disclosure provides a positioning method performed by a positioning system including a target device, a master device and one or more slave devices, the positioning method comprising generating and transmitting a first signal by using the master device; generating and transmitting, by using the target device, a second signal in response to the first signal after lapse of a predetermined delay time interval; measuring a first time interval measured from a time point of the master device's transmitting the first signal to a time point of the master device's receiving a first part of the second signal; measuring a second time interval measured from a time point of the slave device's receiving the first signal to a time point of receiving the first part of the second signal; and determining a position of the target device based on the first time interval, the second time interval, the delay time interval, and a duration of the first part of the second signal.

Yet another at least one embodiment of the present disclosure provides a ranging method using a first signal transmitted by a first device and a second signal transmitted by a second device in response to reception of the first signal, the method calculating a distance between the first device and the second device by using: a first time interval from a time point of the first device's transmitting the first signal to a time point of receiving a first part of the second signal and a second time interval from a time point of the second device's receiving the first part of the second signal to a time point of receiving a second part of the second signal, a delay time interval from a time point of the second device's receiving the first signal to a start time point of the second signal, and a duration of the first part of the second signal and a duration of the second part of the second signal.

DETAILED DESCRIPTION

Figure 1:
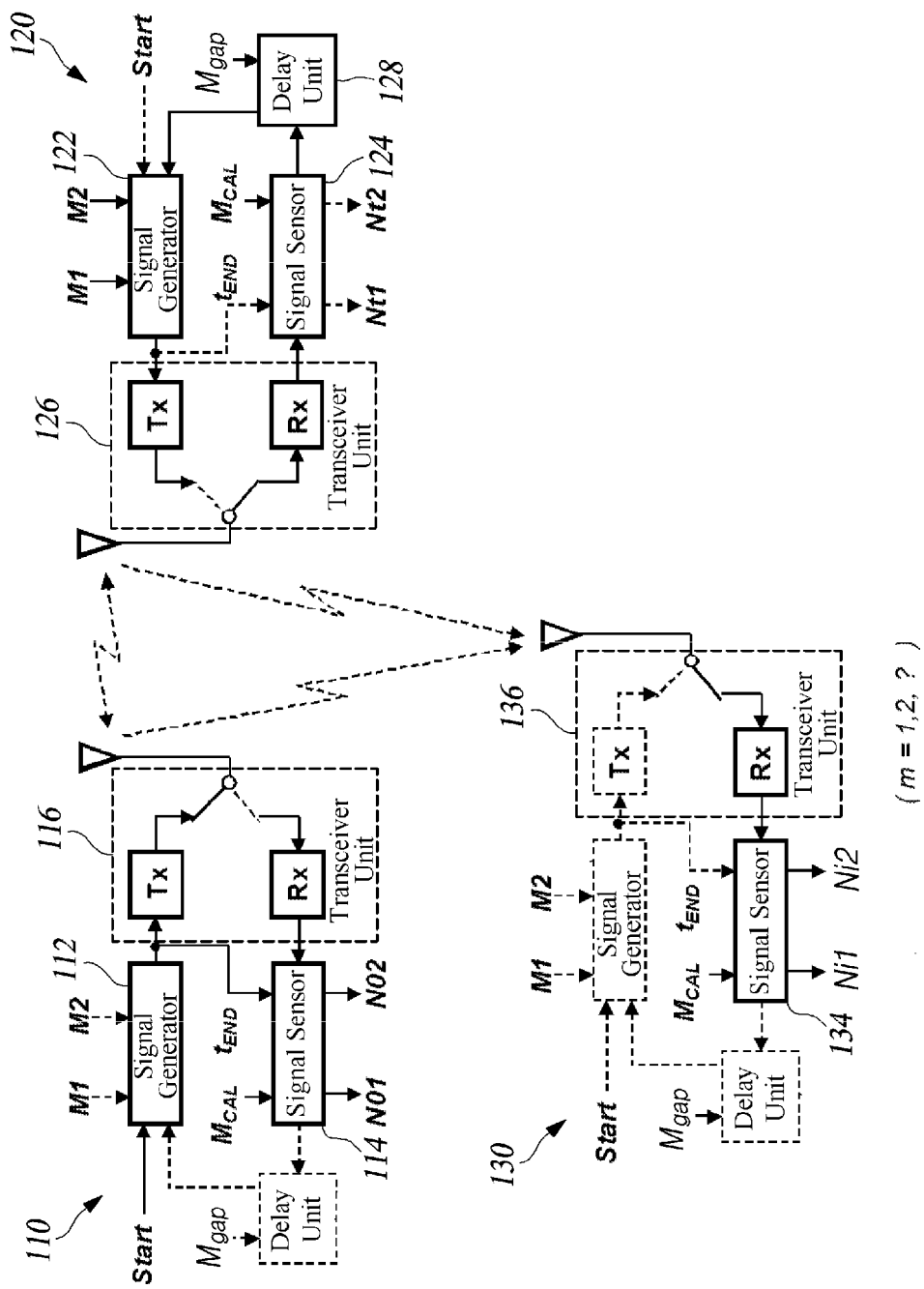
FIG. 1 is a schematic diagram of system architecture for a ranging operation according to at least one embodiment of the present disclosure.

Hereinafter, at least one embodiment of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand the terms are not to imply or suggest the substances, order or sequence of the components. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

A ranging method according to an embodiment of the present disclosure uses a first signal transmitted by a first device and a second signal transmitted by the target device in response to the first signal, in order to measure the distance between the second device and the target device.

Hereinafter, for the purpose of description, the first device will be referred to as a master access point (MAP) and the second device will be referred to as a slave access point (SAP), but the scope of the present invention is not limited by such terms. It is obvious that other devices than the access point (AP) can be used as the first and the second devices.

FIG. 1 is a schematic diagram of system architecture for a ranging operation according to at least one embodiment of the present disclosure.

As illustrated in FIG. 1, a ranging system according to an embodiment of the present disclosure includes a MAP 110, a target device 120, and a SAP 130.

MAP 110 generates and transmits a first signal, and receives a second signal generated and transmitted by target device 120 in response to the first signal. Further, MAP 110 measures a time interval from the point in time of MAP's 110 transmitting the first signal to its time point of receiving at least a part of the second signal.

Target device 120 generates and transmits the second signal in response to the reception of the first signal from MAP 110.

SAP 130 receives the first signal transmitted by MAP 110 and the second signal transmitted by target device 120. Further, SAP 130 measures a time interval from a time point of SAP's 130 receiving the first signal to its time point of receiving at least a part of the second signal.

On the premise that the distance between MAP 110 and SAP 130 is known, the distance between SAP 130 and target device 120 can be measured by using the time interval measured by MAP 110, the time interval measured by SAP 130, a delay time of target device's 120 from the point of receiving the first signal to the starting time of the second signal, and the duration of at least a part of the second signal. Ranging the distance between SAP 130 and target device 120 may be performed through the above method by a ranging apparatus (not shown) which may be a separate independent apparatus or may be installed on a device such as SAP 130.

Figure 2:
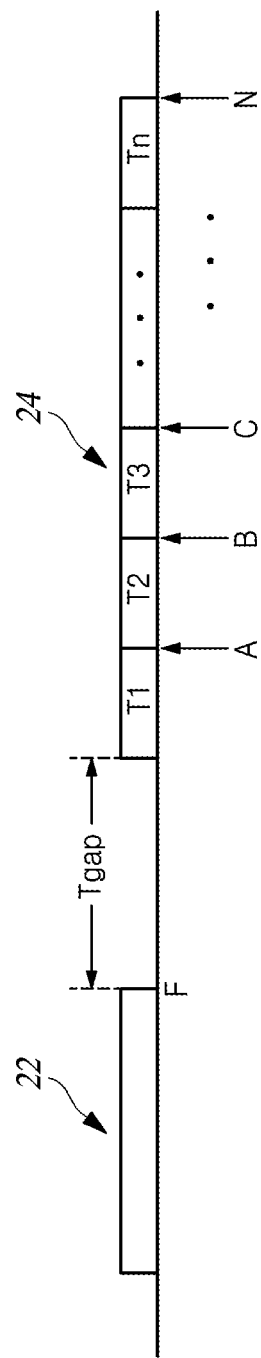
FIG. 2 is diagram of an example of reception time of a secondary signal by MAP and SAP.

Referring to FIG. 2, the "time point of receiving at least a part of the second signal" as measured by MAP 110 and SAP 130 refers to one or more among time point A of receiving a second signal 24 by the length of time interval T1, a time point B of receiving the same signal by the length of time interval (T1+T2), and a time point N of receiving the same signal by the length of time interval (T1+T2+ . . . +Tn). The time point to be measured may be prearranged between MAP 110 and SAP 130. For example, it is prearranged to measure only time point A, only time point N, or both time points A and N.

Meanwhile, the duration of at least a part of the second signal generated by target device 120 may be T1 if the prearrangement between MAP 110 and SAP 130 is to measure only time point A. Further, when it is prearranged between MAP 110 and SAP 130 to measure both the time points A and N, each duration of at least a part of the second signal may be T1 and T2+ ... +Tn.

Delay time Tgap of target device's 120 from the time point of receiving a first signal 22 to the time point of starting to generate the second signal 24 and the duration of at least a part of the second signal generated by target device 120 may be shared in advance between target device 120 and the ranging apparatus. For example, when only time point A is measured and used for the ranging, delay time Tgap and time interval T1 may be shared in advance. When time point A and time point N are measured and used for the ranging, delay time Tgap, time interval T1 of a first part of the second signal, and time interval T2+T3 ... +Tn of a second part of the second signal may be shared in advance. However, the scope of the present invention is not limited thereto, and target device 120 may transmit the delay time and the duration of at least a part of the second signal to the ranging apparatus. However, pre-sharing the delay time and the duration of at least a part of the second signal between the target device and the ranging apparatus provides an advantage of reducing loads on a communication path such as an air space.

Hereinafter, the ranging method according to an embodiment of the present disclosure will be described in more detail with reference to FIGS. 1, 3 and 4.

Figure 3:
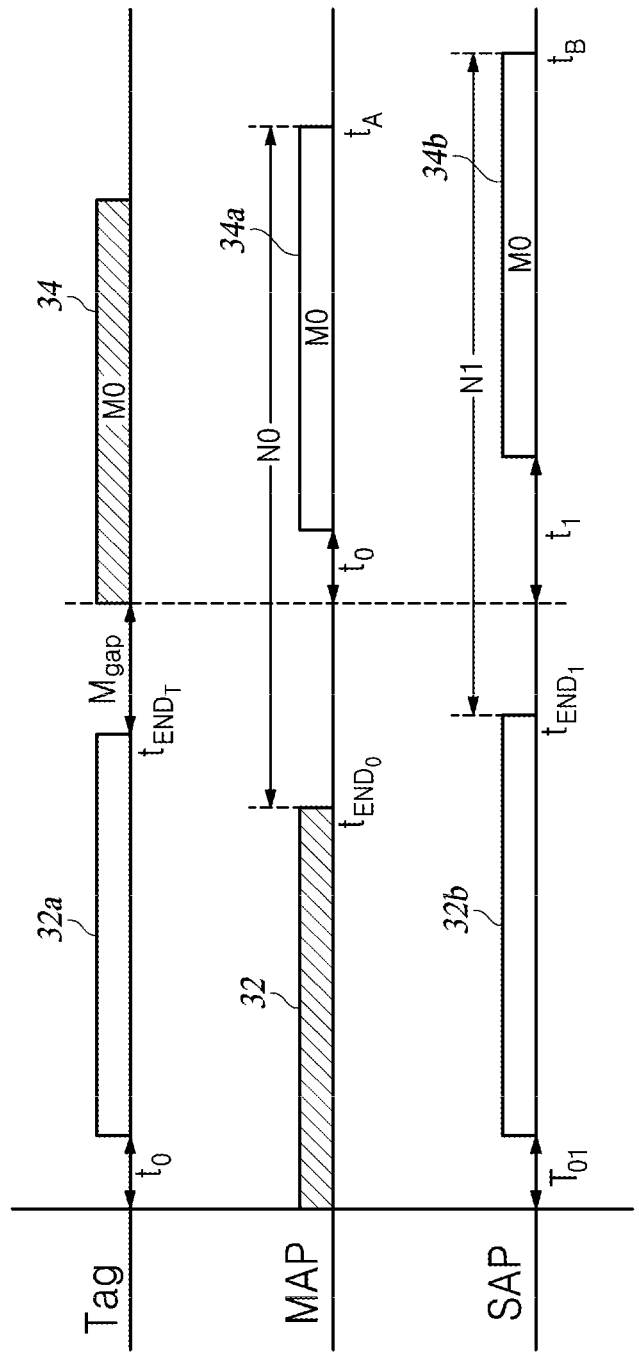
FIG. 3 is a schematic diagram of a ranging method according to a first embodiment of the present disclosure.

FIG. 3 is an exemplary diagram of a ranging method according to a first embodiment of the present disclosure.

The first embodiment of the present disclosure describes a method of checking and using the reception time point of one random part of the second signal for calculating a distance. For the convenience of a description, although it is assumed to check the time point of completing the reception of the whole second signal, the present disclosure is not limited thereto and the same principle as in the following description can be applied to the case of measuring one random part like time point A or the time point B in FIG. 2 as described above.

A signal generator 112 of MAP 110 generates and propagates a first signal 32 to an air interface through its transceiver 116. In this event, signal generator 112 of MAP 110 checks and transmits transmission end point $t_{END0}$ of the first signal to a signal detector 114.

First signal 32 transmitted from MAP 110 is received by target device 120 after lapse of Time of Flight (ToF) t0.

A first signal 32a received by a transceiver 126 of target device 120 is transmitted to a signal detector 124 which then detects and transmits reception end point $t_{ENDT}$ of the same first signal to a delay unit 128 of target device 120.

Delay unit 128 waits for a preset delay time Tgap from reception end point $t_{ENDT}$ of the first signal, and then transmits the end point of the delay time to a signal generator 122.

Signal generator 122 generates a second signal 34 starting at the end point of the delay time and propagates the generated second signal 34 to an air interface through transceiver 126.

The second signal transmitted by target device 120 is received by MAP 110 after lapse of the time of flight t0, and MAP 110 transmits a second signal 34a received through transceiver 116 to signal detector 114.

Signal detector 114 of MAP 110 measures point $t_A$ at the end of receiving second signal 34a.

With the measurement of point $t_A$ of ending the reception of second signal 34a, a measurement can be made for a first time interval of MAP 110 from point $t_{END0}$ of transmitting the first signal to point $t_A$ of receiving second signal 34a. Distance d0 between MAP 110 and target device 120 can be calculated by using the measured first time interval, a delay time from the time point of the target device's receiving the first signal to the time point of starting to generate the second signal, and the duration of the second signal. Distance d0 can be calculated by Equation 1.

$$d0 = c^*(t01 - Tgap - T0)/2 \quad \text{Equation 1}$$

In Equation 1, c denotes a transmission rate of a signal in a medium, t01 denotes a first time interval, Tgap denotes a delay time, and T0 denotes the duration of the second signal.

Meanwhile, Equation 1 may be differently expressed into Equation 2 below with the time interval and duration expressed by counts of clock periods.

$$d0 = c^* T_{CLK}^*(N0 - Mgap - M0)/2 \quad \text{Equation 2}$$

In Equation 2, c denotes a transmission rate of a signal in a medium, $T_{CLK}$ denotes a nominal clock period, N0 denotes the counts by MAP 110 of its own clocks during first time interval t01, Mgap denotes the number of clocks used for generating the delay time Tgap, and M0 denotes the number of clocks used for generating duration T0 of the second signal. The nominal clock period is an ideal value of the clock period which is shared between devices.

Meanwhile, SAP 130 measures a second time interval from the point of SAP's 130 receiving the respective first signal transmitted by MAP 110 and target device 120 to the point of SAP's 130 receiving the second signal. Therefore, in an embodiment of the present disclosure, SAP 130 only receives the signals transmitted by MAP 110 and target device 120.

More specifically, when SAP 130 receives first signal 32 transmitted by MAP 110 after lapse of time of flight $T_{O1}$, SAP 130 transmits the received signal 32b to a signal detector 134 through a transceiver 136. Signal detector 134 checks for reception end point $t_{END1}$ of received signal 32b. Further, when SAP 130 receives second signal 34 transmitted by target device 120 after lapse of time of flight t1, SAP 130 checks for reception end point $t_B$ of received signal 34b from target device 120. In addition, a measurement is made for the second time interval from point $t_{END1}$ of receiving the first signal to point $t_B$ of receiving the second signal.

When the second time interval is measured, distance d1 between SAP 130 and target device can be calculated by using the second time interval, a delay time since target device 120 receives the first signal until it starts to generate the second signal, the duration of the second signal, and the calculated distance d0 between MAP 110 and target device 120. Distance d1 can be calculated by Equation 3.

$$d1 = c^*(t11 - Tgap - T0) + D01 - d0 \quad \text{Equation 3}$$

In Equation 3, t11 denotes the second time interval.

Meanwhile, Equation 3 may be differently expressed into Equation 4 below with the time interval and duration expressed by counts of clock periods.

$$d1 = c^* T_{CLK}^*(N1 - Mgap - M0) + D01 - d0 \quad \text{Equation 4}$$

In Equation 4, N1 denotes the counts by SAP 130 of its own clocks during second time interval t11, and D01 denotes the distance between MAP 110 and SAP 130.

Meanwhile, it is noted that distance d1 between SAP 130 and target device is expressed by Equation 5 by putting Equation 2 into Equation 4.

$$d1 = c * T_{CLK} * \left(N1 - \frac{N0 + Mgap + M0}{2}\right) + D01 \quad \text{Equation 5}$$

In Equation 5, it is noted that the distance between SAP 130 and target device 120 is calculated based on the first time interval t01 or N0 from the point, when MAP 110 transmits the first signal to the point, when the it receives the second signal, second time interval t11 or N1 from the point when SAP 130 receives the first signal to the point when it receives the second signal, delay time Tgap or Mgap since target device 120 receives the first signal until it generates the second signal, duration T0 or M0 of the second signal, and distance D01 between MAP 110 and SAP 130.

Accordingly, on the premise that the delay time in the target device is known, the duration of the second signal generated by target device 120, and the distance between MAP 110 and SAP 130, the distance between SAP 130 and target device 120 can be calculated by measuring the time interval from the point of MAP's 110 receiving the first signal to the point of receiving the second signal and the time interval from the point of SAP's 130 receiving the first signal to the point of receiving the second signal.

Meanwhile, in the embodiment described above, an actual clock frequency of each of MAP 110, target device 120, and SAP 130 may be different from the nominal clock frequency. Accordingly, when there is clock frequency deviation, a resultant ranging error may be generated in the calculation of the distance by applying Equations 2, 4 and 5. The ranging error due to the clock frequency deviation may be compensated through a second embodiment described below.

Figure 4:
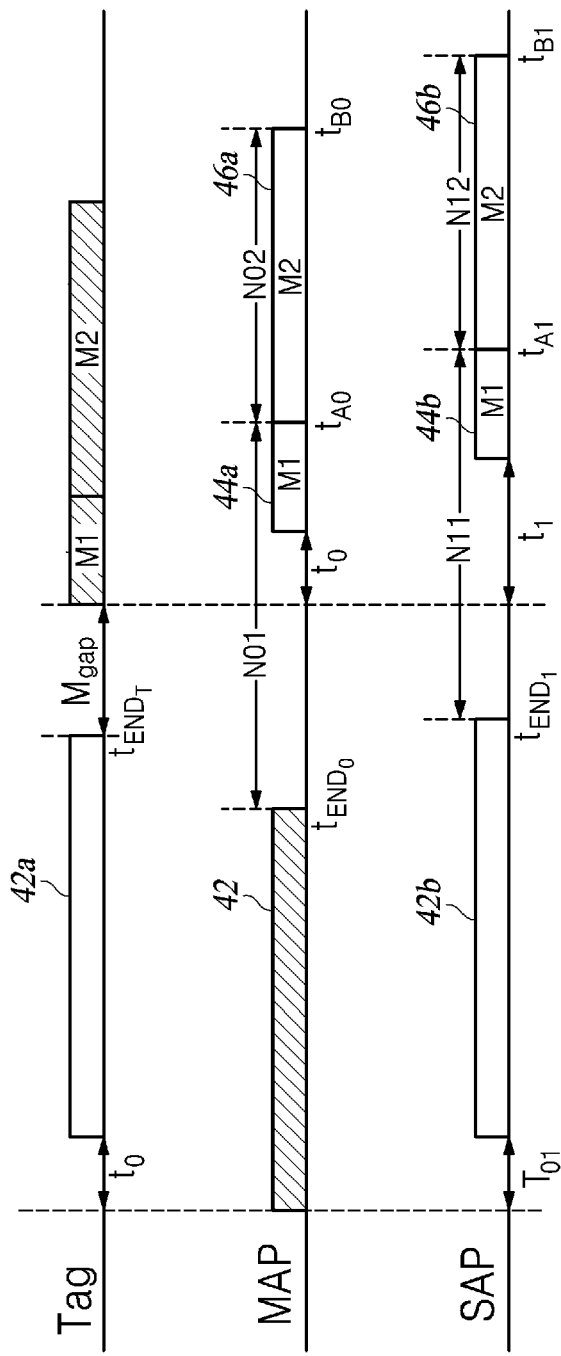
FIG. 4 is a schematic diagram of a ranging method according to a second embodiment of the present disclosure.

FIG. 4 is an exemplary diagram of a ranging method according to a second embodiment of the present disclosure.

While the first embodiment measures just the reception point of one random part of the second signal, the second embodiment further measures and uses the reception point of another part of the second signal for the ranging operation.

Signal generator 112 of MAP 110 generates a first signal 42 and propagates the generated first signal 42 to an air interface through transceiver 116. In this event, signal generator 112 of MAP 110 checks the time point $t_{END0}$ when transmission of the first signal ends and transmits time point $t_{END0}$ to signal detector 114.

First signal 42 transmitted by MAP 110 is received by target device 120 after lapse of time of flight to.

A first signal 42a received by transceiver 126 of target device 120 is transmitted to signal detector 124, and signal detector 124 detects reception end time point $t_{ENDT}$ of the first signal and transmits reception end time point $t_{ENDT}$ to delay unit 128.

Delay unit 128 waits for a preset delay time Tgap after reception end time point $t_{ENDT}$ of the first signal, and then transmits an end point of the delay time to signal generator 122.

Signal generator 122 generates a second signal starting at the end point of the delay time and propagates the generated second signal to an air interface through transceiver 126.

The second signal transmitted by target device 120 is received by MAP 110 after lapse of time of flight t0, and MAP 110 transmits the second signal received through transceiver 116 to signal detector 114.

Signal detector 114 of MAP 110 checks each of reception end point $t_{A0}$ of a first part 44a of the second signal and reception end point $t_{B0}$ of a second part 46a. Further, MAP 110 measures a first time interval from point $t_{END0}$ of MAP 110 transmitting first signal 42 to point $t_{A0}$ of receiving first part 44a of the second signal and a third time interval from point $t_{A0}$ of receiving first part 44a to point $t_{B0}$ of receiving second part 46a.

When the first time interval and the third time interval are measured, distance d0 between MAP 110 and the target device is calculated by using the measured first and third time intervals, the durations of the first part and the second part of the second signal, and the delay time since the target device receives the first signal until the target device starts to generate the second signal. Distance d0 can be calculated by Equation 6.

$$d0 = c*T_{CLK}*(N01 - Kr*N02)/2$$

$$Kr = (M_{gap} + M1)/M2 \quad \text{Equation 6}$$

In Equation 6, M1 denotes the number of clocks used for generating the duration of the first part of the second signal, M2 denotes the number of clocks used for generating the duration of the second part of the second signal, Mgap denotes the number of clocks used for generating the delay time, N01 denotes the counts by MAP 110 of its own clocks during the first time interval, N02 denotes the counts by MAP 110 of its own clocks during the third time interval, c denotes a signal transmission rate in a medium, and $T_{CLK}$ denotes a nominal clock period.

Meanwhile, SAP 130 receives the first signal and the second signal respectively transmitted by MAP 110 and target device 120 and checks for reception end points thereof.

Upon receiving first signal 42 transmitted by MAP 110 after lapse of time of flight $T_{01}$, SAP 130 transmits received signal 42b to signal detector 134 through transceiver 136. Signal detector 134 checks for reception end point $t_{END1}$ of received first signal 42b. Further, upon receiving the second signal transmitted by target device 120 after lapse of time of flight t1, SAP 130 checks for reception end point $t_{A1}$ of first part 44b and reception end point $t_{B1}$ of second part 46b of the second signal. In addition, SAP 130 measures the second time interval from point $t_{END1}$ of receiving first signal 42b to point $t_{A1}$ of receiving first part 44b of the second signal and a fourth time interval from point $t_{A1}$ of receiving first part 44b to point $t_{B1}$ of receiving second part 46b.

When the second time interval and the fourth time interval are measured, distance d1 between SAP 130 and the target device is calculated by using the measured second and fourth time intervals, the delay time since the target device receives the first signal until it generates the second signal, and the durations of the first part and the second part of the second signal. Equation 7 may be used for calculating distance d1.

$$d1 = c*T_{CLK}*(N11 - Kr*N12) + D01 - d0 \quad \text{Equation 7}$$

In Equation 7, N11 denotes counts by SAP 130 of its own clock period during the second time interval, N12 denotes the counts by SAP 130 of its own clock period during the fourth time interval, and D01 denotes the distance between MAP 110 and SAP 130.

Meanwhile, distance d1 between SAP 130 and target device 120 is expressed by Equation 8 by putting Equation 6 into Equation 7.

$$d1 = c * T_{CLK} * \left[ N11 - \frac{N01}{2} - Kr * \left( N12 - \frac{N02}{2} \right) \right] + D01 \quad \text{Equation 8}$$

Equation 8 tells that the distance between SAP 130 and target device 120 can be calculated based on information as follows: a first time interval N01 of MAP's 110 from the point of transmitting the first signal to the point of receiving the first part of the second signal and third time interval N02 of MAP's 110 from the point of receiving the first part of the second signal to the point of receiving the second part of the second signal, second time interval N11 of SAP's 130 from the point of receiving the first signal to the point of receiving the first part of the second signal and fourth time interval N12 of SAP's 130 from the point of receiving the first part of the second signal to the point of receiving the second part of the second signal, delay time Mgap of target device's 120 from the point of receiving the first signal to the point of starting to generate the second signal, respective durations M1 and M2 of the first part and the second part of the second signal, and distance D01 between MAP 110 and SAP 130.

Accordingly, on the premise that the delay time of the target device is known, the respective durations of the first part and the second part of the second signal generated by target device 120, and the distance between MAP 110 and SAP 130, the distance between SAP 130 and target device 120 can be calculated by using a time interval of MAP's 110 from the point of transmitting the first signal to the point of receiving the first part of the second signal and a time interval of MAP's 110 from the point of receiving the first part of the second signal to the point of receiving the second part of the second signal, and a time interval of SAP's 130 from the point of receiving the first signal to the point of receiving the first part of the second signal and a time interval of SAP's 130 from the point of receiving the first part of the second signal to the point of receiving the second part of the second signal.

Further, according to the method, the compensation is provided for a ranging error generated due to clock frequency deviation between the devices (MAP, target device, and SAP).

Calculating the distance between the MAP 110 and target device 120 is described as an example. With respect to nominal clock period $T_{CLK}$, assuming that an actual clock period of MAP 110 is $T_{CLK1}$, an actual clock period of target device 120 is $T_{CLK2}$, the ratio of deviation between $T_{CLK}$ and $T_{CLK1}$ is (1+e1), and the ratio of deviation between $T_{CLK}$ and $T_{CLK2}$ is (1+e2), the relationship shown in Equation 9 is established. In Equation 9, $T_{CLK}$ denotes the nominal clock period and is an already known constant value, and e1 and e2 are unknown values.

$$T_{CLK1} = T_{CLK}/(1+e1)$$

$$T_{CLK2} = T_{CLK}/(1+e2) \quad \text{Equation 9}$$

Meanwhile, since N01 and N02 measured by MAP 110 are calculated with MAP's own actual clock period $T_{CLK1}$ of MAP 110, and the time interval/durations Mgap, M1, and M2 are generated with actual clock period $T_{CLK2}$ of target device 120 in Equation 6, the relationship of Equation 10 is established.

$$N1 = [(M_{GAP}+M1)*T_{CLK2}+2*ToF]/T_{CLK1}$$

$$N2 = M2*T_{CLK2}/T_{CLK1} \quad \text{Equation 10}$$

In Equation 10, ToF denotes the time of flight of the signal between MAP 110 and target device 120, which corresponds to t0 in FIG. 4.

The distance between MAP 110 and target device 120 is reduced into Equation 11 by putting Equation 10 into Equation 6 and applying Equation 9.

$$d0 = c*(1+e1)*ToF \quad \text{Equation 11}$$

The actual spatial distance between MAP 110 and target device 120 is valued c*ToF. Accordingly, compared to a result of Equation 9, it is noted that there occurs a ranging error of ratio (1+e1) which is the same as the ratio of deviation between actual clock period $T_{CLK1}$ of a first transceiver and nominal clock period $T_{CLK}$. This means that any possible deviation occurred in the actual clock period (or frequency) of the transceiver does not aggravate the ranging error into more than the ratio of deviation of the actual clock period (or frequency).

Meanwhile, in an embodiment of measuring only one time point of completing reception of the whole second signal, M0=M1+M2 and N0=N01+N02. Accordingly, Equation 12 is established by applying Equations 9 and 10 to Equation 2.

$$d0 = c*(1+e1)*ToF + \\ c*T_{CLK}*(Mgap+M1+M2)*\frac{e1-e2}{2(e1+e2)} \quad \text{Equation 12}$$

In comparison with Equation 11, it is noted that an additional ranging error occurs corresponding to the second term in Equation 12. That is, when the difference between the clock frequencies of two devices is generated, the ranging error becomes significantly larger than a difference ratio between the clock frequencies.

Therefore, the second embodiment of the present disclosure is better than the first embodiment for significantly reducing the ranging error due to the clock frequency deviation.

Although the second embodiment of the present disclosure is described, as an example, for calculating the distance by measuring the reception time points of the first part of the second signal and of its second part, that is, by measuring reception time points of two random parts of the second signal, the scope of the present disclosure is not limited thereto. For example, when measuring reception time points of three random parts of the second signal, for example, time points A, C and N in FIG. 2, the distance may be calculated by using a part of time interval T1 and a part of time interval T4+ . . . +Tn. In this case, the same principle may be applied as the method of calculating the distance by measuring two random parts of the second signal.

Meanwhile, a factor causing a time measurement error in the ranging technology may include an intrinsic time delay of circuit devices used in implementing the transceiver besides the clock deviations between transceivers. The intrinsic time delay may be generated by factors such as the length of a wire line used for the circuit, length of a printed wiring board (PWB) pattern, an inductor, a capacitor, and a clock delay of a digital signal. Since the intrinsic time delays are a factor unaccounted for in the transceiver design, compensation thereof will achieve more accurate ranging.

To this end, a time delay calibration is performed by inputting value Mcal for the intrinsic time delay into signal detectors 114, 124 and 134 in FIG. 1.

For example, the value of the intrinsic time delay is measured by a measuring instrument under a particular environment condition, and the measured value is input as Mcal into signal detectors 114, 124 and 134. Then, the time delay calibration functionality can be implemented by rendering signal detector 124 of target device 120 to transmit input value Mcal to delay unit 128 which causes less delay in the aimed delay time Mgap by same amount as the additionally generated intrinsic delay Mcal. In addition, the time delay calibration may be performed by making signal detectors 114 and 134 of MAP 110 and SAP 130 output the values such as N01, N02, Ni1 and Ni2 less intrinsic time delay value Mcal generated in addition to the actual time delay value.

Meanwhile, the intrinsic time delay value may be changed due to the influence of a change in ambient temperature, a change in a supply voltage, an aging change, or a combination thereof. Accordingly, an automatic correction may be performed by a measuring instrument for measuring the time delay variances according to the environmental change, storing the measured variances in a table, estimating the time delay variance by the environmental change and inputting the accordingly estimated value of Mcal.

Meanwhile, another factor causing the time measurement error is the influence of a unit time value used for measuring an elapsed time when the circuit is digitally implemented. The unit time value used for generating the first signal and the second signal and for measuring the first to fourth time intervals/durations directly affects the ranging accuracy. For example, the first time interval N0 in FIG. 3 is output as an integer value when the counts by $T_{CLK1}$ measure the time interval between the two time points as with the point of the MAP's transmitting the first signal and the point of receiving the second signal. However, strictly speaking, N0 is divided into an integer and a fraction number if the time interval between the two time points is divided by $T_{CLK1}$. When only the integer part generated by the $T_{CLK1}$ counting is used, a ranging error corresponding to the fraction number part may be generated and a maximum of an error corresponding to $T_{CLK1}$ may be generated.

Figure 5:
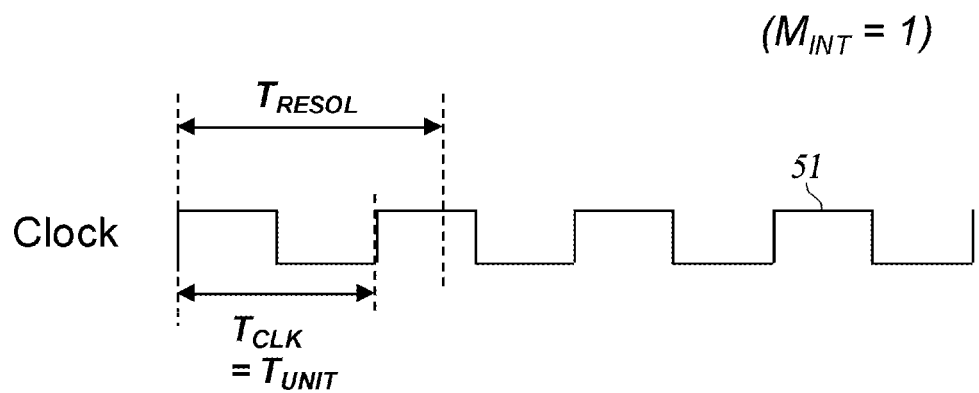
FIG. 5 is a graph showing clock period $T_{CLK}$ when it is equal to unit time $T_{UNIT}$.

FIG. 5 is an exemplary diagram of clock period $T_{CLK}$ as being equal to unit time $T_{UNIT}$.

A signal 51 is a clock waveform, and $T_{CLK}$ is a value of a nominal clock period. In order to realize required ranging precision, $T_{UNIT}$ should be smaller than time resolution $T_{RESOL}$. In other words, using a clock period satisfying equation $T_{RESOL} \geq T_{UNIT}(=T_{CLK})$ achieves the required ranging precision against an occurrence of measurement error as much as the fraction number part because it is still smaller than $T_{RESOL}$.

For example, when the required ranging precision is $T_{RESOL}=1/3e8=3.33$ nsec, it is good to use a clock having $T_{CLK}$ smaller than 3.33 nsec, that is, a clock of a frequency equal to or larger than 300 MHz.

However, as described in the above example, when the clock frequency equal to or larger than 300 MHz is used, there may be a difficulty in the implementation due to power consumption of an analog to digital converter (ADC), a digital to analog converter (DAC), and a digital circuit.

Accordingly, an interpolation method may be used as the method of making $T_{UNIT}$ smaller than the time resolution value required for realizing the required ranging precision. When the interpolation method is used, an equivalent time resolution may be implemented in which the clock period is equally divided by a random integer when a signal is generated or an arrival time of a received signal is measured.

In an embodiment of the present disclosure, the random integer is defined as a division integer of interpolation and indicated by $M_{INT}$. Division integer $M_{INT}$ may use a designated random integer value. In a digital type, the implementation is facilitated by using a power of 2 such as 2, 4, 8, 16 . . . .

Figure 6:
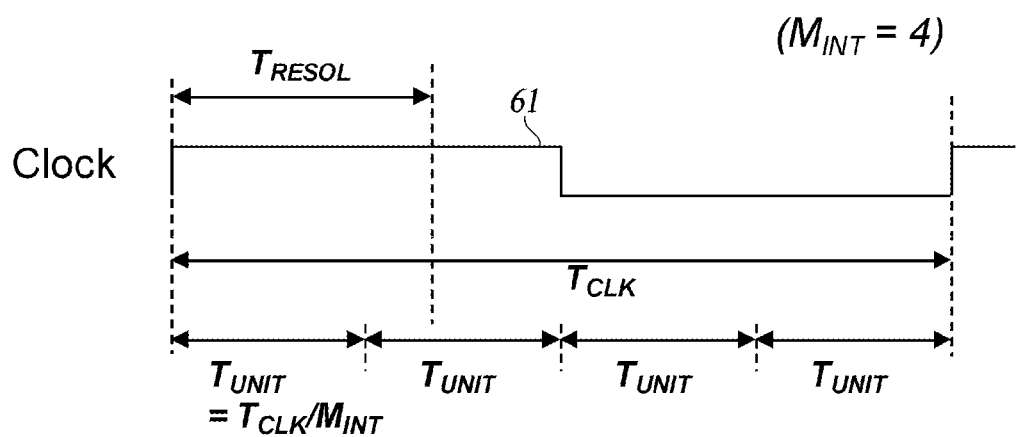
FIG. 6 is an exemplary diagram of clock period $T_{CLK}$ as being equal to unit time $T_{UNIT} \times M_{INT}$.

FIG. 6 is a graph showing a clock period $T_{CLK}$ corresponding to $M_{INT}$ times of a unit time $T_{UNIT}$. FIG. 5 is for $M_{INT}$ being 1 whereas FIG. 6 shows $M_{INT}$ as 4.

In a signal generation or measurement of the arrival time of the received signal, the interpolation is used to acquire the unit time with the required precision. A signal 61 is a clock waveform and $T_{CLK}$ is the nominal clock period. $T_{UNIT}$ represents a unit time acquired by dividing $T_{CLK}$ by the division integer $M_{INT}$ by using the interpolation. When $T_{UNIT}$ acquired from dividing $T_{CLK}$ by the division integer $M_{INT}$ is smaller than the required time resolution $T_{RESOL}$ or when equation $T_{RESOL} \geq T_{CLK}/M_{INT}$ is satisfied, the required ranging resolution can be realized even with a low frequency clock.

When the aforementioned interpolation method is applied, Equation 2 and Equations 4 to 8 used for the ranging may be generalized as Equations 13 to 18.

$$d0 = D_{CLK} * (N0 - Mgap - M0)/2 \qquad \text{Equation 13}$$

$$d1 = D_{CLK} * (N1 - Mgap - M0) + D01 - d0 \qquad \text{Equation 14}$$

$$d1 = D_{CLK} * \left(N1 - \frac{N0 + Mgap + M0}{2}\right) + D01 \qquad \text{Equation 15}$$

$$d0 = D_{CLK} * (N01 - Kr * N02)/2 \qquad \text{Equation 16}$$

$$d1 = D_{CLK} * (N11 - Kr * N12) + D01 - d0 \qquad \text{Equation 17}$$

$$d1 = D_{CLK} * \left[N11 - \frac{N01}{2} - Kr * \left(N12 - \frac{N02}{2}\right)\right] + D01 \qquad \text{Equation 18}$$

In Equations 13 to 18, $D_{CLK}=c*(T_{CLK}/M_{INT})$.

Further, in the above equations, N0, N01, and N02 are counts by MAP 110 of the unit time from dividing the MAP's own clock period by interpolation division integer $M_{INT}$, and N1, N11, and N12 are counts by SAP 130 of the unit time from dividing the SAP's own clock period by $M_{INT}$.

Described hereinafter is a method of positioning the target device by using the aforementioned ranging method.

Figure 7:
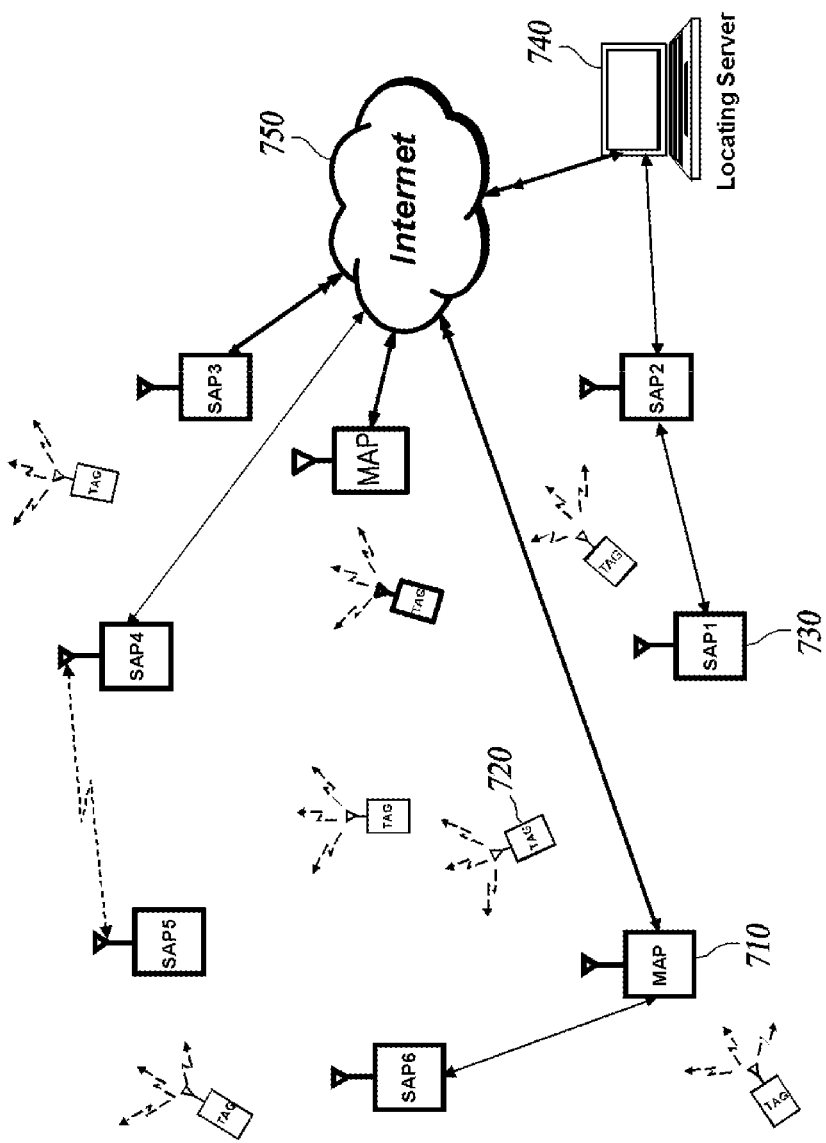
FIG. 7 is a schematic diagram of the architecture of a positioning system according to at least one embodiment.

FIG. 7 is a diagram of the architecture of a positioning system according to at least one embodiment of the present disclosure.

A positioning system according to an embodiment of the present disclosure includes a MAP 710, a target device 720, a SAP 730, and a locating server 740. One MAP 710, at least one SAP 730, and locating server 740 may get involved in the positioning of target device 720. Locating server 740 may be connected with MAP 710 and SAP 730 through various communication paths, for example, access paths such as a wireless path, a wired path, and Internet 750.

Figure 8:
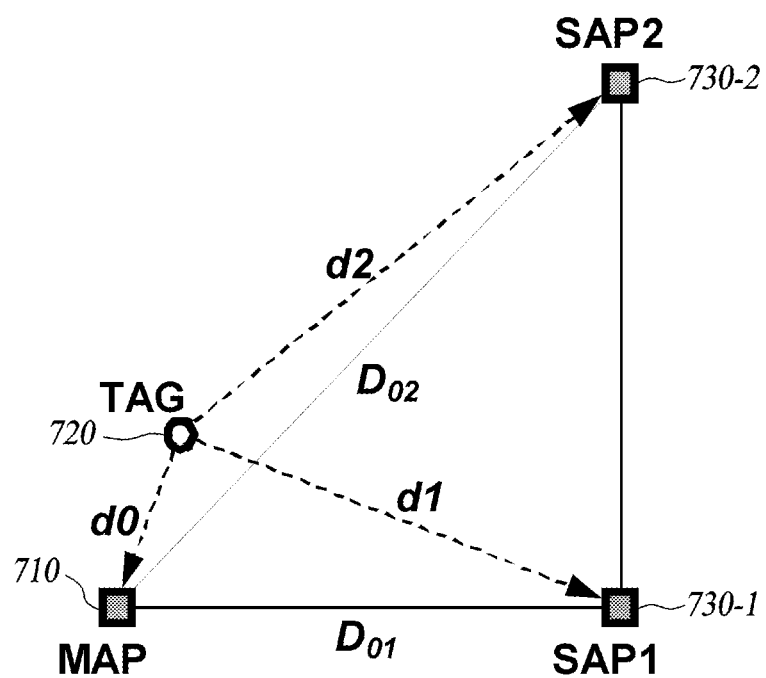
FIG. 8 is a diagram of simplified positioning system of FIG. 7.

For convenience' sake, two SAPs will be described hereinafter as being involved in positioning the target device with reference to FIG. 8, but it is obviously not to limit the scope of the present disclosure and the number of SAPs may be determined to be one or more as necessary.

First, MAP 710 generates and transmits a first signal.

When target device 720 receives the first signal, target device 720 responsively generates and transmits a second signal after lapse of a predetermined delay time.

MAP 710 having received the second signal from target device 720 measures a first time interval of MAP's 710 from the point of transmitting the first signal to the point of receiving a first part of the second signal. Here, the point of receiving the first part of the second signal may be time point A or B of receiving a part of the second signal or time point N of completing the reception of the whole second signal as illustrated in FIG. 2.

Meanwhile, a first SAP 730-1 and a second SAP 730-2 receive each of the first signal transmitted from MAP 710 and the second signal transmitted from target device 720, and measure a second time interval from the time point of first SAP's 730-1 receiving the first signal to the time point of second SAP 730-2 receiving the first part of the second signal.

Locating server 740 determines the location of target device 720 based on the time intervals measured by MAP 710, first SAP 730-1 and second SAP 730-2, a delay time since target device 720 receives the first signal until it starts to generate the second signal, and the duration of the first part of the second signal.

A method performed by locating server 740 for determining the position of target device 720 will be described in more detail. Distance d0 between MAP 710 and target device 720 is calculated by using the first time interval measured by MAP 710, the delay time of target device's 720 from the point of receiving the first signal to the start time point of the second signal, and the duration of the first part of the second signal. Distance d0 may be calculated as described above, for example, through one of Equations 1, 2 and 13.

Further, the locating server 740 calculates distance d1 from each of SAPs 730-1 and 730-2 to target device 720 by using the second time interval measured by SAPs 730-1 and 730-2, the delay time of target device's 720 from the time point of receiving the first signal to the start time point of the second signal, and the durations of the first part of the second signal. In di, index i is used to distinguish the SAPs. i=1 applies to first SAP 730-1, and i=2 applies to second SAP 730-2. Distance di may be calculated as described above, for example, by using Equation 19 below.

$$d_i=D_{CLK}*(N_i-M\text{gap}-M0)+D0i-d0 (i=1,2) \qquad \text{Equation 19}$$

In Equation 19, Ni represents the second time interval of counts by an ith SAP of the unit time generated by dividing the SAP's own clock period by the interpolation division integer, and D0i represents the distance between MAP 710 and the ith SAP.

When the distances from the APs to the target device are calculated, locating server 740 determines the position of target device 720 by using the calculated distances and position information on each of the APs through the trilateration method.

Meanwhile, in order to reduce a positioning error due to a clock frequency deviation between the devices (MAP, SAP and target device), MAP 710 and SAPs 730-1 and 730-2 can check reception time points of two random parts of the second signal.

Specifically, MAP 710 measures a third time interval from the reception time point of the first part of the second signal to the reception time point of the second part of the second signal as well as the first time interval from the transmission time point of the first signal to the reception time point of the first part of the second signal. Further, MAP 710 acquires the first time interval of counts N01 by MAP 710 of the unit time generated by dividing the MAP's own clock period by the interpolation division integer (equal to or larger than 1) and the third time interval of counts N02 by MAP 710 of the unit time.

Each of SAPs 730-1 and 730-2 measures a fourth time interval from the reception time point of the first part of the second signal to the reception time point of the second part of the second signal as well as the second time interval from the reception time point of the first signal to the reception time point of the first part of the second signal. Further, SAPs 730-1 and 730-2 acquire the second time interval of counts Ni1 by the SAP of the unit time from dividing the SAP's own clock period by the interpolation division integer and the fourth time interval of counts Ni2 by the SAP of the unit time.

Locating server 740 calculates distance d0 between MAP 710 and target device 720 based on counts N01 and N02 by MAP 710. Distance d0 may be calculated as described above, for example, by using Equation 6 or 16.

Further, locating server 740 calculates distance di from each of SAPs 730-1 and 730-2 to target device 720 based on counts Ni1 and Ni2 by SAPs 730-1 and 730-2. Distance di may be calculated as described above, for example, by using Equation 20.

$$d_i=D_{CLK}*(N_i1-Kr*N_i2)+D0i-d0 (i=1,2) \qquad \text{Equation 20}$$

In Equation 20, Ni1 and Ni2 represent the second time interval of counts by the ith SAP of the unit time from dividing the SAP's own clock period by the interpolation division integer and the fourth time interval of counts by the ith SAP of the unit time, respectively.

When distances d0 and di are calculated, locating server 740 can determine the position of target device 720 by using positional information on each of the APs.

Although the above embodiment has described with the two SAPs, the scope of the present disclosure is not limited thereto, and, for example, three SAPs may be used. In this event, the position of target device 720 may be determined by a multilateration method. Further, in some cases, only one SAP may be used to measure the position of the target device. For example, the distance between the SAP and the target device and the distance between the MAP and the target device are calculated. In this event, two intersection points are generated by drawing circles having radiuses of the measured distances about the locations of the APs as their centers, and the target device is located at one of the two intersection points. However, if one intersection point is an impossible place for locating the target device, the location of the target device can be determined without the measurement of a distance between another SAP and the target device.

In contrast to the TDoA method in which the target device only transmits the blink signal and the APs only receive the blink signal, the positioning method according to an embodiment of the present disclosure described above is characterized by determining the position of the target device through the target device and the MAP each making singular signal transmission and reception and the SAPs only receiving the two signals.

In the conventional TDoA, clock frequency and phrase synchronization are required between the APs and between the APs and the target device, but the positioning method according to an embodiment of the present disclosure does not require clock synchronization between the APs, thereby simplifying the overall system architecture. Further, compared to the conventional RT-ToA method of requiring four signal exchanges between the each AP and the target device, the positioning method according to an embodiment of the present disclosure requires only two signal exchanges between the MAP and the target device, thereby reducing loads of the air interface. In addition, according to the second embodiment of measuring time points of two random parts of the second signal, there is also an advantage of reducing the positioning error generated due to the clock frequency deviation.

Meanwhile, the positioning system according to an embodiment of the present disclosure may include a functionality of switching the roles of the SAP and the MAP. In other words, by rearranging the conventional MAP as a new SAP and the conventional SAP as a new MAP, the positioning system can become more flexible.

Meanwhile, the first signal generated and transmitted by the MAP 710 may include at least one of MAP identification information, target device identification information, a sequence number for each target device identification information, current time information, and next wake-up time information assigned for each target device identification information.

The MAP identification information may be included in the first signal to allow the target device and the SAPs to recognize where the first signal originates from.

The target device identification information may be included in the first signal to allow the target device and the SAPs to recognize the target device subject to the ranging among a plurality of devices. In other words, a plurality of target devices which receive the first signal compare identification information pre-stored in the target devices themselves with the target device identification information included in the first signal. When the information matches, the target device recognizes that the target device itself is the called device, and generates and transmits the second signal. When the information does not match, the target device disregards the first signal and does not transmit the second signal.

The sequence number for identification information on each target device may be used when all APs transmit identification information and a sequence number of a particular target device to the locating server together with measurement information as a bundle. During a process performed by all APs for transmitting information on the target devices measured from the first signal and the second signal to the locating server, time points of the information arrived at the locating server may be different depending on a communication condition of an information transmission path. Since the first signal of the target device may be repeatedly transmitted at predetermined time intervals, sequences of pieces of information on the same target device transmitted to the located server by the APs may be disordered due to differences in the transmission time points. The measurement values can be distinguished by the identification number and sequence number of the target device through inserting the same identification number and sequence number into the first signal and updating and transmitting the sequence number of the corresponding identification information into a different value at every transmission of the first signal including the identification number. For example, when a sequence number having a value from 0 to 255 is updated into a different value every time and measurement information is transmitted to the locating server every one second, if the difference between measurement information arrival times for respective communication paths is equal to or smaller than 256 seconds, an error in data aggregation can be prevented from occurring due to the difference between the measurement information arrival times.

More specifically, when MAP 710 and SAPs 730-1 and 730-2 transmit the measured time intervals together with the identification information and the sequence number of the target device included in the first signal to locating server 740, the locating server 740 classifies and manages the received time intervals by using the identification information and the sequence number of the target device and calculates a distance by using only elapsed time values classified based on the same identification information and sequence number. Accordingly, even with disordered arrival sequences of the measured values sequentially transmitted by MAP 710 and SAPs 730-1 and 730-2 due to a difference in a time delay for each communication path, the ranging and positioning errors can be prevented.

Meanwhile, the next wake-up time information may be included in the first signal to reduce power consumption of target device 720. In other words, target device 720 in a low power sleep mode awakes from the low power sleep mode and shifts the low power sleep mode to an active mode by using the next wake-up time information just before the transmission of the first signal starts, receives the first signal, and then shifts the mode back to the sleep mode upon completion of the transmission of the second signal. Therefore, the target device can reduce power consumption by shifting between the sleep mode and the active mode with the next wake-up time information.

MAP 710 generates a time reference signal by using its own Real Time Clock (RTC) and transmits the generated time reference signal to the target device or the SAPs, so that the target device or the SAP may control its own RTC by using the reference time signal to match the RTC with the RTC of MAP 710.

Further, when there is one or more target devices within a communication area, MAP 710 calls or loads the target devices based on a predetermined load sequence. When all the target devices are completely located, MAP 710 may repeat the load process. Through such a method, positions of all the target devices within the communication area of the MAP can be successively determined according to the sequence without conflicts.

Meanwhile, the positioning method according to an embodiment of the present invention may perform an initialization operation for communication between target device 720 and MAP 710. When the target device first turns on the power and moves from a communication area of one MAP to a communication area of another MAP, the initialization operation may be performed when the wake-up time of the target device does not match the load time (when to transmit the first signal) of the MAP.

The initialization operation may be performed through the following method.

First, the target device awakes from the sleep mode, shifts the sleep mode to the active mode, transmits an access signal including its own identification information, ends transmission of the access signal, and then waits for a control signal from the MAP during a preset time-out period.

When the target device receives the control signal from one MAP within the time-out period, the target device sets the RTC and the next wake-up time of the target device itself by using the current time information and the next wake-up time information included in the control signal, so as to complete the initialization.

However, when the target device receives no control signal within the time-out period, the target device shifts the active mode to the sleep mode and shifts back the sleep mode to the active mode after a preset recess time interval so as to repeat the process of transmitting the access signal.

Meanwhile, one or more MAPs having received the access signal from the target device transmit their own MA identification information, identification information of the target device having transmitted the access signal, and quality information of the received signal, to the locating server.

The locating server selects an optimal MAP suitable for communication with the target device from the one or more MAPs by using the quality information of the received signal and informs the optimal MAP of a result of the selection.

When the optimal MAP receives the access signal from the target device after being informed of the selection result, the optimal MAP transmits the control signal including the current time information and the next wake-up time information to the target device, thereby initializing the target device to be enabled to communicate with the target device itself.

Meanwhile, when there is a plurality of MAPs around the target device, the positioning method according to an embodiment of the present disclosure may include a process of selecting the optimal MAP to perform communication with the target device from the plurality of MAPs.

For example, when the plurality of MAPs receive the second signal generated and transmitted by the target device, the MAPs transmit their own identification information, identification information of the target device, and quality information of the received signal to the locating server. The identification information of the target device may be extracted from the second signal transmitted by the target device and then transmitted to the locating server.

The locating server selects the optimal MAP suitable for communication with the target device by using the quality information of the received signal and informs the optimal MAP of a result of the selection.

The optimal MAP having received the selection result transmits the first signal to the target device to perform the aforementioned positioning process.

Through the process of selecting the optimal MAP, the target device performs the positioning process with the MAP most suitable for the communication, so that positioning precision can be constantly maintained even for the target device in motion.

FIGS. 9A and 9B are graphs of comparing/analyzing capabilities of the positioning method according an embodiment of the present disclosure and the conventional TDoA method. FIG. 9A is a graph showing a capability of the conventional TDoA method, and FIG. 9B is a graph showing the capability of the positioning method according to an embodiment of the present disclosure.

In order to compare the capabilities, a total of four APs are used. Coordinates of the given APs are as follows.

Coordinate of AP0 or MAP: (−50−j50)m
Coordinate of AP1 or SAP1: (+50−j50)m
Coordinate of AP2 or SAP2: (+50+j50)m
Coordinate of AP3 or SAP3: (−50+j50)m In order to effectively analyze the capability of the positioning system, a random measurement error 0.3 m rms is added as the ranging error between the APs and the target device. The location of the target device is measured thirty times while the location is sequentially moved in the sequence of [−100−j*80, −100−j*60, −100−j*40, −100−j*20, −100−j*0, −66+j*0, −33+j*0, 0+j*0, 25+j*0, 50+j*8, 70+j*20, 85+j*35, 100+j*50], and the measured locations are indicated by points.

Figure 9:
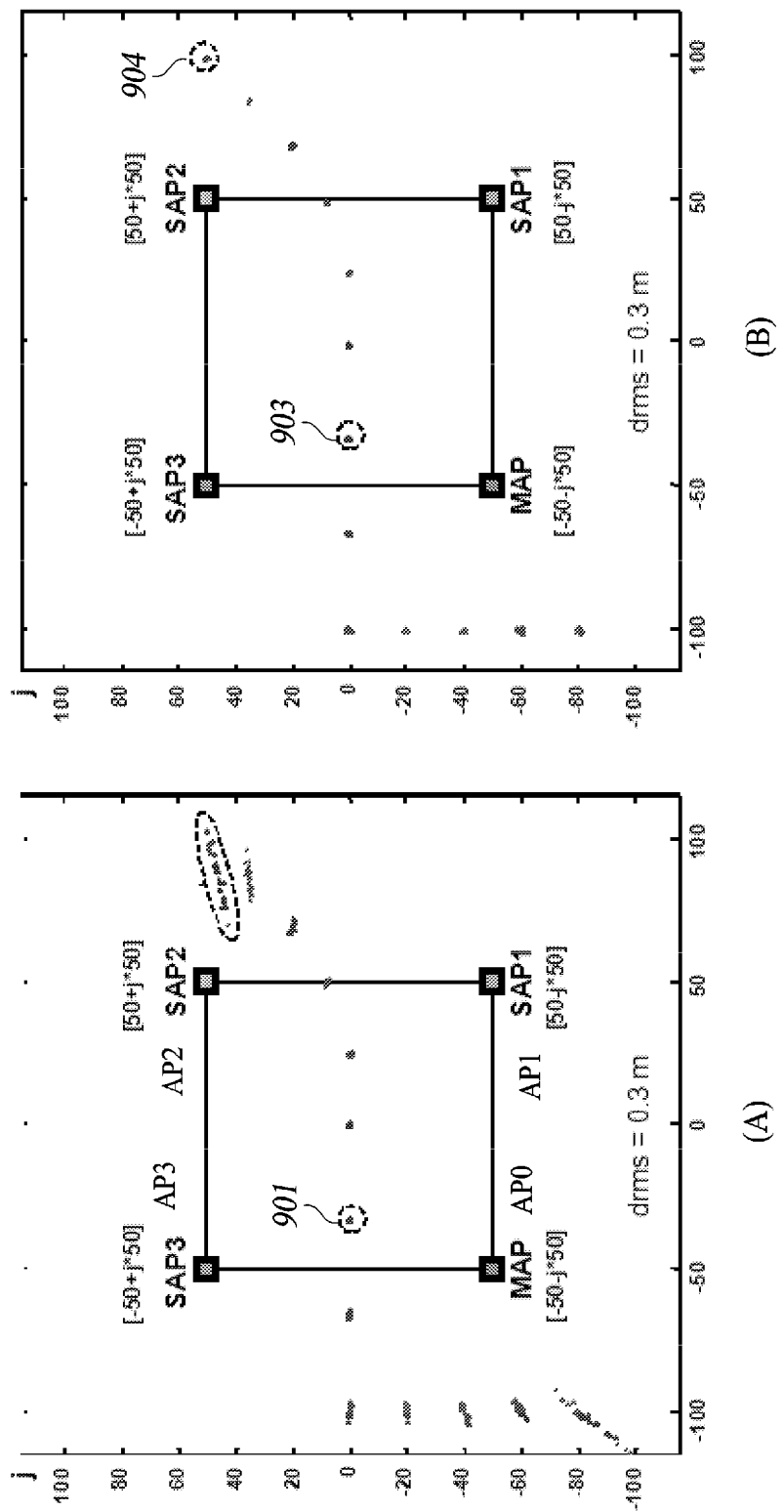
FIG. 9 is a graph of comparison/analysis of the positioning method according the present embodiments with a conventional TDoA method of positioning.

As a result of analyzing the positioning precision of the TDoA method, as indicated by a reference numeral 901, while the positioning error is stable within the arrival time measurement error when the target device is located inside the cell including four APs, the positioning error expands up to several times to several dozen times of the arrival time measurement error and thus is very unstable. In FIG. 9, it can be identified that, as the target device is farther from the inside of the cell, variation between positioning values generated whenever the positioning is performed becomes larger and thus the positioning precision is deteriorated.

On the other hand, the result of analyzing the precision of the positioning values according to an embodiment of the present disclosure identifies that the margin of error is stable within a size of the ranging error in both cases where the target device is located inside and outside of the cell including four APs as indicated by reference numerals 903 and 904, respectively.

In the description above, although all of the components of the embodiments of the present disclosure may have been explained as assembled or operatively connected as a unit, one of ordinary skill would understand the present disclosure is not limited to such embodiments. Rather, within some embodiments of the present disclosure, the respective components are selectively and operatively combined in any number of ways. Every one of the components are capable of being implemented alone in hardware or combined in part or as a whole and implemented in a computer program having program modules residing in computer readable media and causing a processor or microprocessor to execute functions of the hardware equivalents. Codes or code segments to constitute such a program are understood by a person skilled in the art. The computer program is stored in a non-transitory computer readable media, which in operation realizes the embodiments of the present disclosure. The computer readable media includes magnetic recording media, optical recording media or carrier wave media, in some embodiments.

Although exemplary embodiments of the present disclosure have been described for illustrative purposes, those skilled in the art will appreciate that various modifications, additions and substitutions are possible, without departing from the essential characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

CROSS-REFERENCE TO RELATED APPLICATION

If applicable, this application claims priority under 35 U.S.C. §119(a) of Patent Application No. 10-2011-0041183, filed on Apr. 29, 2011 in Korea, the entire content of which is incorporated herein by reference. In addition, this non-provisional application claims priority in countries, other than the U.S., with the same reason based on the Korean Patent Application, the entire content of which is hereby incorporated by reference.

The invention claimed is:

1. A ranging method by using a first signal transmitted by a first device and a second signal generated and transmitted by a target device in response to the first signal, the method characterized in calculating a distance between the target device and a second device being in communication with the first device and the target device, by using:

a first time interval measured from a time point of the first device's completing transmission of the first signal to a time point of the first device's completing reception of a first part of the second signal, and a third time interval measured from a time point of the first device's completing reception of the first part of the second signal to a time point of the first device's completing reception of a second part of the second signal;

a second time interval measured from a time point of the second device's completing reception of the first signal to a time point of the second device's completing reception of the first part of the second signal, and a fourth time interval measured from a time point of the second device's completing reception of the first part of the second signal to a time point of the second device's completing reception of the second part of the second signal;

a given delay time interval from a time point of the target device's completing reception of the first signal to a start time of the second signal and a given duration of each of the first and the second parts of the second signal; and a given distance between the first device and the second device.

2. The ranging method of claim 1, wherein a distance d0 between the first device and the target device is calculated by the following equation, based on the first time interval of counts N01, measured by the first device, of a unit time generated by dividing the first device's clock period by an interpolation division integer and the third time interval of counts N02, measured by the first device, of the unit time:

$$d0=D_{CLK}*(N01-Kr*N02)/2$$

$$Kr=(Mgap+M1)/M2, D_{CLK}=c*(T_{CLK}/M_{INT}),$$

where c denotes a transmission speed of a signal in a medium, $T_{CLK}$ denotes a nominal clock period, $M_{INT}$ denotes the given interpolation division integer greater than or equal to 1, Mgap denotes given counts of $T_{CLK}/M_{INT}$ which are used for generating the delay time interval, M1 denotes given counts of $T_{CLK}/M_{INT}$ which are used for generation of the first part of the second signal, and M2 denotes given counts of $T_{CLK}/M_{INT}$ which are used for generation of the second part of the second signal.

3. The ranging method of claim 2, wherein a distance d1 between the second device and the target device is calculated by the following equation, based on the second time interval of counts N11, measured by the second device, of a unit time generated by dividing the second device's clock period by the interpolation division integer, the fourth time interval of counts N12, measured by the second device, of the unit time, the given delay time interval, the given duration of the first part of the second signal, the given distance between the first device and the A second device, and the calculated distance d0:

$$d1=D_{CLK}*(N11-Kr*N12)+D01-d0,$$

where D01 denotes the given distance between the first device and the second device.

4. A ranging apparatus using a first signal transmitted by a first device and a second signal generated and transmitted by a target device in response to the first signal, the ranging apparatus calculating a distance between the target device and a second device being in communication with the first device and the target device, by using:

a first time interval measured from a time point of the first device's completing transmission of the first signal to a time point of the first device's completing reception of a first part of the second signal, and a third time interval measured from a time point of the first device's completing reception of the first part of the second signal to a time point of the first device's completing reception of a second part of the second signal;

a second time interval measured from a time point of the second device's completing reception of the first signal to a time point of the second device's completing reception of the first part of the second signal, and a fourth time interval measured from a time point of the second device's completing reception of the first part of the second signal to a time point of the second device's completing reception of the second part of the second signal;

a given delay time interval from a time point of the target device's completing reception of the first signal to a start time point of the second signal and a given duration of each of the first and the second parts of the second signal; and a given distance between the first device and the second device.

5. A method for determining a position of a target device by a positioning system including the target device, a master device and one or more slave devices, the method comprising:

generating and transmitting a first signal by the master device;

generating and transmitting, by the target device, a second signal in response to the first signal after elapse of a given delay time interval from completion of reception of the first signal;

measuring a first time interval from a time point of the master device's completing the transmission of the first signal to a time point of the master device's completing reception of a first part of the second signal, and a third time interval from a time point of the master device's completing reception of the first part of the second signal to a time point of the master device's completing reception of a second part of the second signal;

measuring a second time interval from a time point of each slave device's completing reception of the first signal to a time point of said each slave device's completing reception of the first part of the second signal, and a fourth time interval measured from a time point of said each slave device's completing reception of the first part of the second signal to a time point of said each slave device's completing reception of the second part of the second signal;

calculating a distance between said each slave device and the target device based on the measured first time interval, the measured third time interval, the measured second time interval, the measured fourth time interval, the given delay time interval, a given duration of each of the first and the second parts of the second signal, and a given distance between the master device and said each slave device; and determining the position of the target device by using the distance between said each slave device and the target device.

6. The positioning method of claim 5, further comprising:

calculating a distance d0 between the master device and the target device, based on the first time interval of counts N01 of a unit time generated by dividing the master device's clock period by an interpolation division integer and the third time interval of counts N02 of the unit time;

calculating a distance di between said each slave device and the target device, based on the second time interval of counts Ni1 (index i=1, ..., $N_{SLAVE}$, $N_{SLAVE}$ is the integer number of total slave devices) of a unit time generated by dividing the slave device's clock period by an interpolation division integer and the fourth time interval of counts Ni2 of the unit time; and determining a position of the target device by using the distance d0, the distance di, and position information of the master device and the slave devices, wherein the distances d0 and di are calculated by equation $$d0=D_{CLK}*(N01-Kr*N02)2)/2$$

$$di=D_{CLK}K*(Ni1-Kr*Ni2)+D0i-d0$$

$$Kr=(Mgap+M1)/M2, D_{CLK}=C*(T_{CLK}/M_{INT}),$$

where c denotes a transmission speed of a signal in a medium, $T_{CLK}$ denotes a nominal clock period, $M_{INT}$ denotes the given interpolation division integer greater than or equal to 1, Mgap denotes given counts of $T_{CLK}/$ $M_{INT}$ which are used for generating the delay time interval, M1 denotes given counts of $T_{CLK}/M_{INT}$ which are used for generation of the first part of the second signal, M2 denotes given counts of $T_{CLK}/M_{INT}$ which are used for generation of the second part of the second signal, and D0i denotes the given distance between the master device and said each slave device.

7. A ranging method using a first signal transmitted by a first device and a second signal transmitted by a second device in response to reception of the first signal, the method calculating a distance between the first device and the second device by using:
   a first time interval measured from a time point of the first device's completing transmission of the first signal to a time point of the first device's completing reception of a first part of the second signal, and a second time interval measured from a time point of the first device's completing reception of the first part of the second signal to a time point of the first device's completing reception of a second part of the second signal;
   a given delay time interval from a time point of the second device's completing reception of the first signal to a start time point of the second signal; and
   a given duration of each of the first and the second parts of the second signal,
   wherein a distance d0 between the first device and the second device is calculated, based on the first time interval of counts N01, measured by the first device, of a unit time generated by dividing a first device clock period by an interpolation division integer and the second time interval of counts N02, measured by the first device, of the unit time,
   wherein the interpolation division integer is equal to or larger than 1.

8. The ranging method of claim 7, wherein the distance d0 is calculated by equation $$d0 = D_{CLK} * (N01 - Kr * N2)/2$$

$$Kr = (Mgap + M1)/M2, D_{CLK} = c * (T_{CLK}/M_{INT}),$$

where c denotes a transmission speed of a signal in a medium, $T_{CLK}$ denotes a nominal clock period, $M_{INT}$ denotes the given interpolation division integer greater than or equal to 1, Mgap denotes given counts of $T_{CLK}/M_{INT}$ which are used for generating the delay time interval, M1 denotes given counts of $T_{CLK}/M_{INT}$ which are used for generation of the first part of the second signal, and M2 denotes given counts of $T_{CLK}/M_{INT}$ which are used for generation of the second part of the second signal.

9. The ranging method of claim 7, wherein a $T_{CLK}/M_{INT}$ is smaller than or equal to time resolution required for a positioning.

* * * * *